United States Patent Office 3,577,357
Patented May 4, 1971

3,577,357
SELECTIVELY SULFONATED BLOCK
COPOLYMERS
De Loss E. Winkler, Orinda, Calif., assignor to Shell Oil
Company, New York, N.Y.
No Drawing. Filed Nov. 29, 1968, Ser. No. 780,179
Int. Cl. C08j 1/34
U.S. Cl. 260—2.2                               7 Claims

ABSTRACT OF THE DISCLOSURE

Block copolymers exhibiting water absorption characteristics indicating their use in water purification membranes and the like comprise block copolymers having sulfonated polyvinyl arene blocks and alpha-olefin elastomeric blocks, the sulfur content of the copolymers varying from about 1% by weight to one sulfonated radical per monovinyl arene unit.

---

This invention is concerned with the production of certain selectively sulfonated block copolymers. More particularly, it is directed to the production of water swellable block copolymers containing sulfonate substituents in the non-elastomeric portions thereof and which maintain a high degree of their original tensile strength and other elastomeric properties.

The sulfonation of polymers has been studied for the particular purpose of producing ion exchange resins. While such materials are useful either as such or in their salt forms, they have usually the material disadvantage of being brittle substances which tend to shatter or break due to thermal influences or physical shock and consequently exhibit material, commercial, and technical limitations in these respects.

It would be especially desirable to have available a polymer which is useful not only as an ion exchange polymer but which also possesses a high degree of water absorption capability and a high degree of retention of its original physical properties such as tensile strength, elongation, flexibility, etc., in spite of either its derivatization or the presence of absorbed water.

It is an object of the present invention to provide an improved block copolymer especially for use in water purification and other ion exchange situations. It is a particular object of the invention to provide such a polymer which has a commercially acceptable set of physical properties indicating its use where physical stresses in the presence of water are encountered. Other objects will become apparent during the following detailed description of the invention.

Now, in accordance with the present invention, novel block copolymers are provided having the general configuration A—B—(B—A)$_{1-5}$ wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated substituent for each monovinyl arene unit. The sulfonated polymers may be used as such or may be in the form of their acid, alkali metal salt, ammonium salt, or amine salt. Furthermore, they may be in polar interaction with a vinyl pyridine polymer.

It has been found that this class of block copolymers exhibits highly desirable water swellability while at the same time retaining a substantial proportion of their other physical properties including elasticity, tensile strength, modulus, and other suitable properties. Thus their use in water purification programs is indicated as well as their use in ion exchange processes involving the purification of serums, brines, brackish water, sea water, etc.

The block copolymers utilized in the formation of these sulfonated derivatives normally comprise as the block A polymer blocks of monovinyl arenes such as styrene, alpha-methyl styrene, and mixtures thereof, while the blocks B are usually derived by hydrogenation of the preformed block copolymer in such a way as to essentially avoid hydrogenation of the blocks A. Thus the blocks B in their original state are usually polymer blocks of conjugated dienes, usually butadiene or isoprene or mixtures thereof. Upon hydrogenation these diene polymer blocks are thereby converted to essentially the equivalents of alpha-olefin polymer blocks and retain their elastomeric character as long as a sufficient amount of branching is present. Thus the hydrogenation of an isoprene polymer block converts it to what is essentially an ethylene propylene rubber block. If the originally conjugated diene block comprises butadiene, it is desirable to utilize a process which will produce a sufficiently branched structure which when hydrogenated results in an elastomeric block. Thus typical polymers which may be utilized as starting materials have the general configuration polystyrene-polyisoprene-polystyrene or polyalpha-methyl styrene-polyisoprene-polyalpha-methyl styrene. The average molecular weights of the individual blocks usually will vary from about 8,000 to 30,000 in the blocks A and from about 25,000 to 150,000 in the blocks B. Wherever any blocks B are adjacent to each other the average molecular weight of the joined binary block is to be considered as a single block. The block polymers are formed either by sequential processes or by coupling processes as desired, this not forming an essential aspect of the present invention.

In order to obtain the selective sulfonation required for maintenance of the desired set of elastomeric properties, it is necessary to hydrogenate or otherwise inactivate the conjugated diene polymer blocks prior to sulfonation. Selective hydrogenation is effected by means of certain catalysts which selectively hydrogenate conjugated diene linkages while not materially affecting the unsaturation of the monovinyl arene polymer blocks. Nickel on kieselguhr may be employed as a suitable catalyst but still more preferred as catalysts for selective hydrogenation are the reducde metal products of a metal of the group consisting of cobalt, nickel, manganese, molybdenum, and mixtures thereof wherein the reduced metal product is obtained by reacting a compound containing a molecular form of said metal and a metal compound reducing agent such as aluminum hydrocarbyl compound. Specifically, a preferred catalyst comprises the reduction product formed by reaction of nickel acetyl acetonate with aluminum triethyl.

The selectively hydrogenated block copolymers obtained as described above are then treated to form the selectively sulfonated products or their metallized or aminated counterparts. The sulfonation reaction, which usually occurs at temperatures in the range from about −10 to about 100° C., is usually carried out while the copolymer is swollen by or dispersed in an inert medium such as a haloalkane. Preferred media for this purpose include dichloroethane, dichloromethane, dichloropropane, and the like. It is preferred to carry out the sulfonation in dilute solutions so as to avoid or minimize gellation. Temperatures in the order of 0–70° C. are preferred. The sulfonating agent is not highly critical other than to select one which will not cause any material amount of polymer degradation or cross linking. A suitable type comprises the complex of sulfur trioxide with a trialkyl phosphate such as triethyl phosphate dissolved in a halogenated alkane such as 1,2-dichloroethane. Sulfonation also may be carried out in inert substantially saturated hydrocarbons such as alkanes or cycloalkanes including particularly cyclopentane and cyclohexane. Sulfonation is carried out to an extent sufficient to provide at least about 1% by weight of sulfur in the derivatized block copolymer and up to an amount of sulfur corresponding to one sulfonate substituent per monovinyl arene unit. Thus in a block copolymer comprising polystyrene-hydrogenated polyisoprene-polystyrene in which the block molecular weights are 15,000–59,000–17,000, 1% by weight of sulfur corresponds to one sulfonic acid group per 10.8 styrene units.

Following sulfonation, the polymer is coagulated in hot water, pressed to remove water, swollen in a hydrocarbon such as cyclohexane, slurried with water-alcohol and again hot water coagulated.

It is to be emphasized that there is no necessity for nor desirability of cross linking as is normally required in ion exchange resins or normal rubbers in order to obtain sufficient physical strength. The peculiar structure of the present block copolymers is such that the physical strength is created apparently by the non-elastomeric domains comprising the sulfonated monovinyl arene polymer blocks. These in effect replace the physical cross links and thereby not only eliminate the relatively costly step of vulcanization but also enable the reuse of the polymer or reshaping thereof such as cannot be effected with cross linked polymeric materials.

The sulfonated block polymers may, if desired, be utilized in the free acid form or may be neutralized with alkali metals such as sodium, potassium, or lithium or may be reacted with an aminating agent such as ammonia or amines to produce ion exchange resins or polymers especially suitable for water purification and the like.

The sulfonated block copolymers even having as little as 1% sulfur content are very unusual products. They tend to gel even in 5% solution in solvents such as cyclohexane. The addition of small amounts of water will usually stiffen the gel, while the saponification of the sulfonic acid groups with sodium hydroxide will cause the formation of a still stiffer gel. The polymers are insoluble in many solvents such as cyclohexane, benzene, or toluene, although they may swell to a limited extent. Once swollen they may be dissolved in such solvents by the addition of small amounts of ethers such as 1,4-dioxane. The addition of stoichiometric amounts of polyamines such as diethylene triamine causes gel formation from solution.

The products of this invention may be blended if desired with the parent copolymers to obtain modified compositions having a high degree of tensile strength and other properties, although the sulfonated or aminated derivatives thereof have a remarkedly high retention of their original physical properties.

It has been found that relatively thin films of the sulfonated polymers are capable of absorbing 10–100% by weight, based on the film weight, of water at least in one day's time at ambient temperatures. Thus it is indicated that these materials are especially suitable for use in water purification, involving either food products or the desalting of brines or sea water as well as brackish water, particularly in the so-called membrane types of process being investigated for this purpose.

The membrane types of processes remove either salt from saline water or water from salt by passing saline water through the membrane. The processes include electrodialysis, osmionic, reverse osmosis, thermal osmosis, and related processes as well as their combination. Dependent upon the specific membrane material utilized for this purpose, it is preferred that the membranes be prepared from a medium incorporating water as one of its components. Preferably under these conditions it is still further advisable to avoid complete air drying of the film prior to its use in desalinizing water so as to maintain its original high capacity in this respect. Best results usually are obtained, when pressure is applied to a concentrated brine, in one or more stages, starting at about 1,000 p.s.i.g. and increasing stagewise to about 3,000 p.s.i.g.

The membranes may be in the form of sheets or may be shaped to any desirable alternate shape such as in the form of tubing and the like. The surface of the membrane may be altered by superficial coatings if so desired such as coatings of quaternary salts or tertiary amine derivatives of polyvinyl aromatic hydrocarbons, melamine-formaldehyde resins admixed with guanidine or polyacrylic or polymethacrylic acids. Such coatings may be applied in any usual manner, such as by first spraying and if necessary grafting or cross linking to the surface of the sulfonated block copolymer. Plasticizers may be employed for flexibilizing the membrane material and to aid in depositing a suitable membrane.

A pore forming agent may be utilized if desired to increase the osmotic properties of the diaphragm. Plasticizers are suitable to some degree for this purpose and thus form a dual role. After serving as a plasticizer during formation of the membrane, it then may serve as a pore former during and after washing. Thus bifunctional components as dextrose, sucrose, and other sugars as well as water soluble polyhydroxy alcohols including glycerol and polyalkylene glycols as well as their water soluble ethers and esters may be employed. The membranes normally do not require reinforcement but if desired they may be altered by deposition on or laminating with fibers or fabrics such as Dacron, polyvinyl chloride, nylon, and the like. Suitable proportions of plasticizers are 10–50 parts per 100 parts of the sulfonated polymer. The membranes are suitably thin, in the order of .01–3 millimeters. Of course, thicker membranes provide increased strength but suffer from decreased rate of water transmission. Thicknesses above 0.5 millimeter are ordinarily unnecessary.

For certain purposes the polar interaction product of the above-identified sulfonated block polymers may be utilized wherein the sulfonated polymer is combined with a vinyl pyridine polymer in such an amount as to provide 0.1–2 vinyl pyridine units per sulfonate substituent of the sulfonated polymer. Vinyl pyridine-derived polymers may be homopolymers, copolymers of two or more vinyl pyridine types of compounds, or copolymers of a vinyl pyridine with other copolymerizable monomers such as monovinyl arenes including styrene. Typical vinyl pyridines are 2-vinyl pyridine, 3-vinyl pyridine, 4-vinyl pyridine, 3-ethyl-5-vinyl pyridine, as well as similar mono- and di-substituted alkenyl pyridines and the comparable quinolines. The polar interaction products are easily prepared by simple mixing such as mill mixing, melt blending or extrusion of the two components. The vinyl pyridine polymers may be block polymers as well as random copolymers or homopolymers. A suitable block copolymer has the general structure vinyl pyridine polymer-conjugated diene polymer-vinyl pyridine polymer. The vinyl pyridine polymers in general should have average molecular weights in the order of between about 5,000 and 500,000 and preferably have the same molecular weight range as that specified for the sulfonated polymer when a vinyl pyridine block copolymer is employed. Thus in the above type of block copolymer, the vinyl pyridine blocks should have average molecular weights in the order of 8,000–30,000 and conjugated diene polymer blocks having average molecular weights of about 25,000–150,000.

The following examples illustrate the preparation of sulfonated products of this invention.

EXAMPLE I

A sulfonating agent was prepared by the slow addition at 20–25° C. of 80 grams (1.0 mole) of sulfur trioxide to 91 grams (0.5 mole) of triethyl phosphate in 470 grams of 1,2-dichloroethane. The ratio of $SO_3$ to triethyl phosphate is 2:1. One-half of the sulfur trioxide in this complex is available for sulfonating. The volume of the above solution is about 500 cc. so it is 1 molar in active $SO_3$.

A block copolymer was prepared having the structure polystyrene-hydrogenated polyisoprene-polystyrene, the block molecular weight being 15,000–75,000–15,000. To 950 grams of a 5% by weight solution of the block copolymer in cyclohexane there was added after flushing with nitrogen a solution of 100 cc. of 1,2-dichloroethane and 100 cc. of sulfonating reagent. The reactants were stirred under nitrogen for 1.5 hours at 60° C. The reaction mixture was then modified by a 50:50 mixture of isopropyl alcohol and water and the product was coagulated in hot water. The crumb so obtained was rolled on a mill to press out most of the water, then swollen and crumbled in cyclohexane, slurried in isopropyl alcohol/water and again hot water coagulated.

EXAMPLE II

In obtaining products of higher sulfonation, it was preferred to work with 1% solutions of the starting polymer in cyclohexane and allowing the reaction to proceed even after gellation. In one series of runs a 1% solution of the block copolymer in cyclohexane was reacted with 1.73 moles of $SO_3$ as the triethyl phosphate complex per mole of styrene for a total of 16 days at room temperature. The contents of all sample bottles had gelled in three days but the reaction was allowed to continue with the following results.

| Days: | Sulfur weight percent |
|---|---|
| 3 | 2.1 |
| 6 | 3.3 |
| 10 | 4.3 |
| 13 | 4.6 |
| 16 | 5.2 |

I claim as my invention:

1. A sulfonated block copolymer having the general configuration $$A-BA-(B-A)_{1-5}$$

wherein each A is a sulfonated monovinyl arene polymer block having an average molecular weight between about 8,000 and about 30,000 and each B is an essentially saturated elastomeric hydrogenated conjugated diene polymer block having an average molecular weight between about 25,000 and about 150,000, the sulfur content of the block copolymer being from about 1% and up to the sulfur content of a polymer bearing one sulfonated substituent per vinyl arene unit.

2. A block copolymer according to claim 1 wherein the blocks B are hydrogenated polyisoprene blocks.

3. A block copolymer according to claim 1 wherein the blocks A are sulfonated polystyrene blocks.

4. A block copolymer according to claim 1 having the configuration sulfonated polystyrene-hydrogenated polyisoprene-sulfonated polystyrene.

5. A block copolymer according to claim 4 wherein the sulfonate radicals are selected from the group consisting of $-SO_3H$, $-SO_3$ alkali metal, $-SO_3NH_4$, and $SO_3$ amino.

6. A block copolymer polar interaction product of
   (a) a sulfonated polymer A according to claim 1; and
   (b) a vinyl pyridine polymer in an amount to provide 0.1–2 vinyl pyridine units per sulfonate substituent of polymer A.

7. A block copolymer polar interaction product according to claim 6 of
   (a) a sulfonated polymer according to claim 4; and
   (b) a vinyl pyridine block copolymer having the configuration poly(2-vinyl pyridine)-polybutadiene-poly(2-vinyl pyridine).

References Cited

UNITED STATES PATENTS

| 3,304,272 | 2/1967 | Zenftman | 260—2.2 |
| 3,431,323 | 3/1969 | Jones | 260—880 |

FOREIGN PATENTS

| 983,434 | 2/1965 | Great Britain | 260—867 |

SAMUEL H. BLECH, Primary Examiner

U.S. Cl. X.R.

117—138.8UA; 161—227, 231, 253, 254; 210—38; 260—2.5R, 17.4BB, 33.2R, 876B, 878B, 880B